United States Patent [19]
Wilkinson et al.

[11] Patent Number: 4,985,695
[45] Date of Patent: Jan. 15, 1991

[54] COMPUTER SECURITY DEVICE

[76] Inventors: William T. Wilkinson, Fairville and Cossart Rds., Chadds Ford, Pa. 19317; James E. Bent, 30 Cartier Ct., Newark, Del. 19711

[21] Appl. No.: 391,232

[22] Filed: Aug. 9, 1989

[51] Int. Cl.⁵ .................... G08B 13/14; E05B 69/00; H01R 13/70

[52] U.S. Cl. ........................ 340/571; 70/58; 200/43.02; 340/521; 340/693

[58] Field of Search ............ 340/568, 571, 693, 666, 340/584, 521, 333, 825.31; 200/61.45 R, 43.02; 439/304; 307/64, 66; 70/58, 63; 248/553, 551

[56] References Cited

U.S. PATENT DOCUMENTS

| | | | |
|---|---|---|---|
| 3,685,037 | 8/1972 | Bennett et al. | 340/571 |
| 4,063,110 | 12/1977 | Glick | 200/43.02 X |
| 4,212,175 | 7/1980 | Zakow | 70/58 |
| 4,247,743 | 1/1981 | Hinton et al. | 200/43.02 |
| 4,319,228 | 3/1982 | Daniels | 340/521 |
| 4,479,688 | 10/1984 | Jennings | 200/43.02 |
| 4,654,640 | 3/1987 | Carll et al. | 340/568 |
| 4,686,514 | 8/1987 | Liptak, Jr. et al. | 340/571 |
| 4,746,909 | 5/1988 | Israel et al. | 340/568 |
| 4,760,379 | 7/1988 | De Phillipo et al. | 340/507 |

*Primary Examiner*—Joseph A. Orsino
*Assistant Examiner*—Thomas J. Mullen, Jr.
*Attorney, Agent, or Firm*—Connolly & Hutz

[57] ABSTRACT

A computer security device includes a compartmentalized housing. One compartment is for storing floppy disks. Another compartment stores pressure switches associated with various computer components for sounding an alarm if an unauthorized person attempts to move the components. A further compartment stores certain of the components during periods of non-use. A still further compartment stores the electronics for various alarms to indicate tampering, fire, etc.

15 Claims, 5 Drawing Sheets

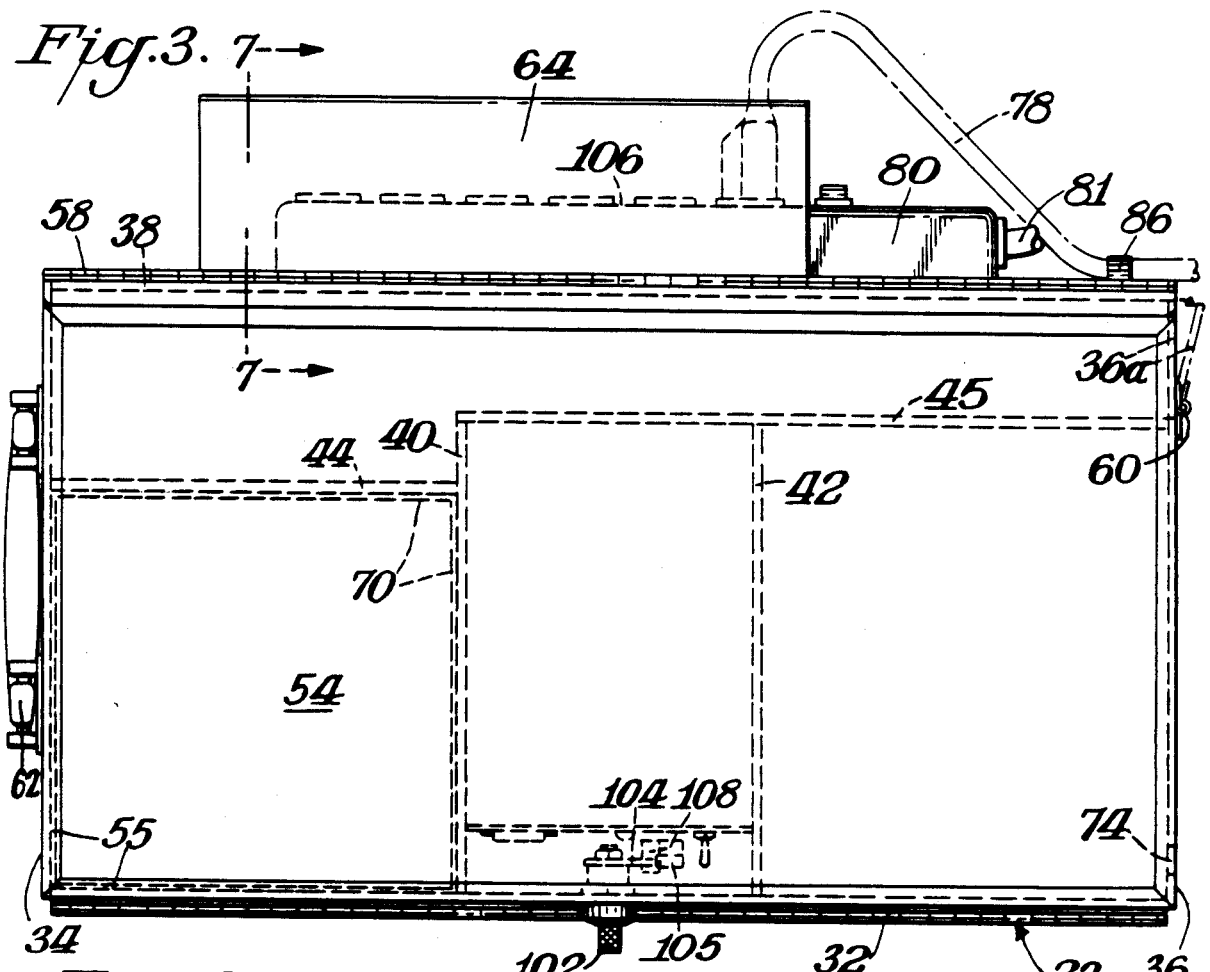
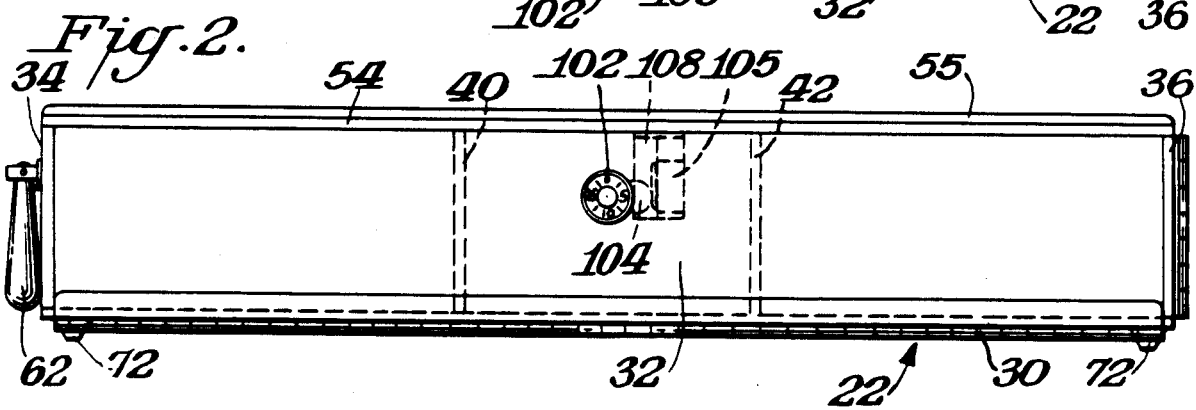
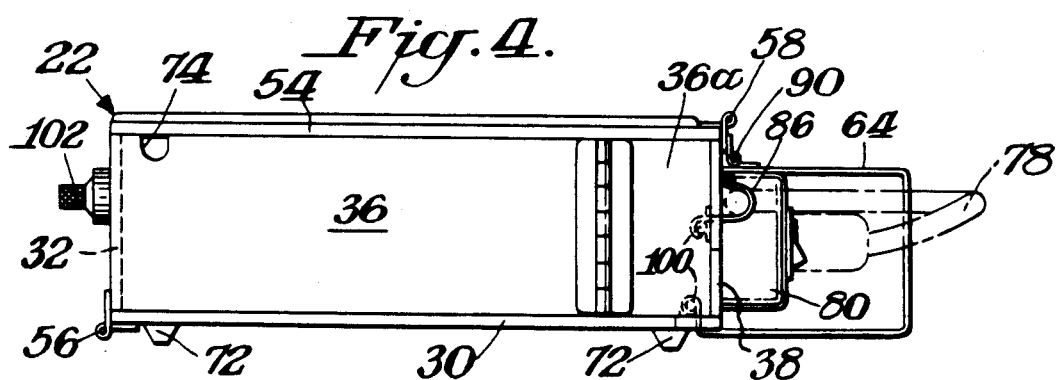

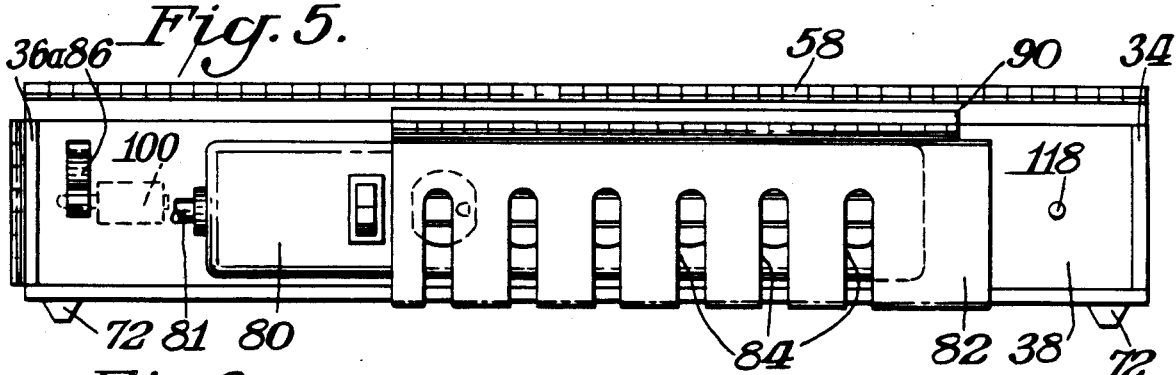
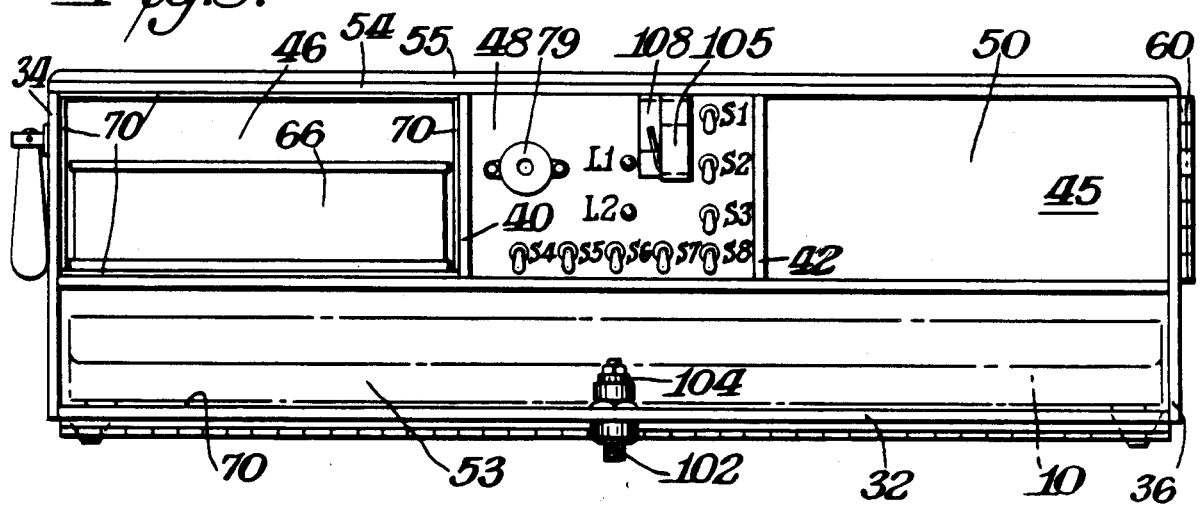
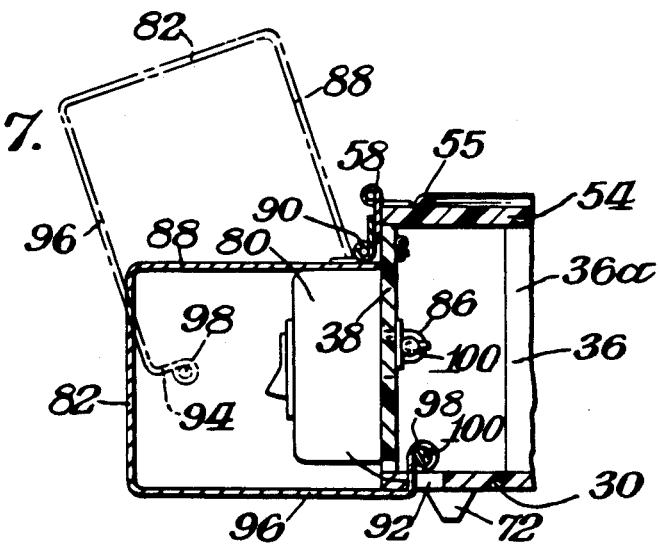

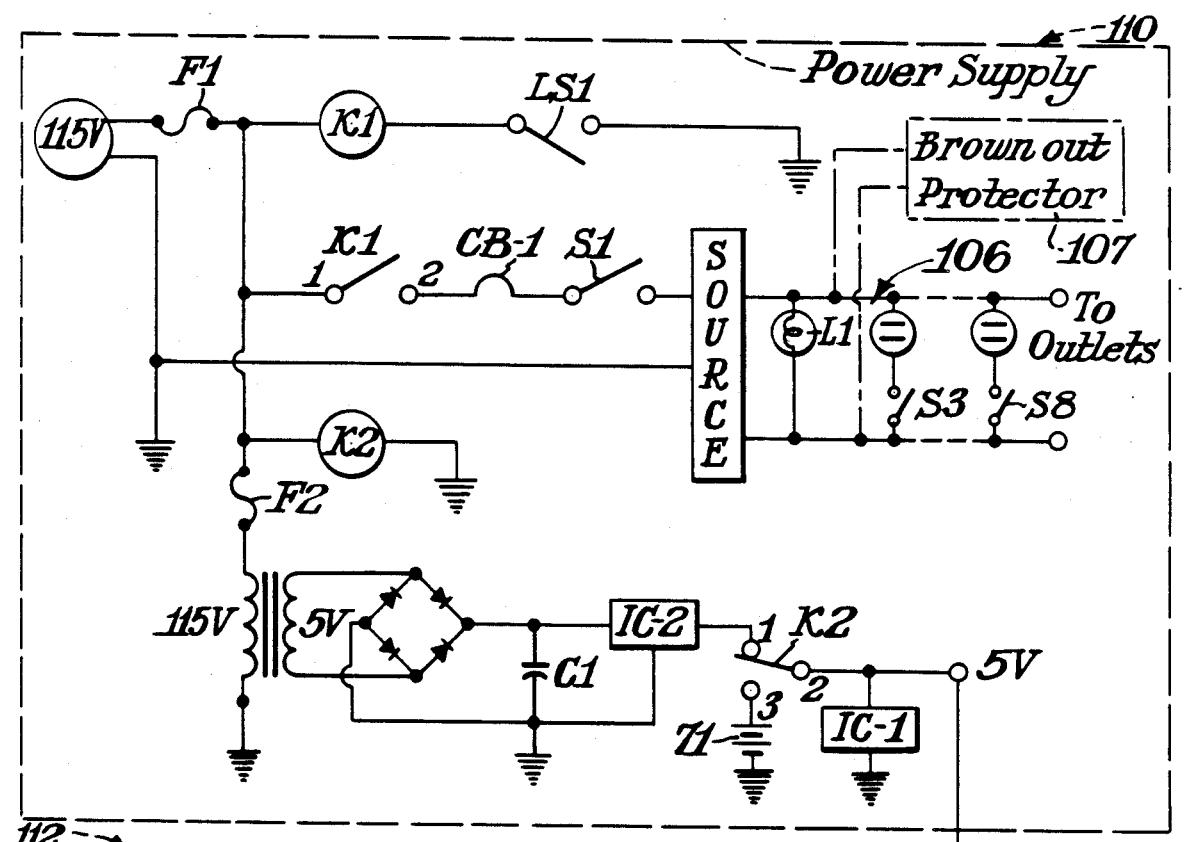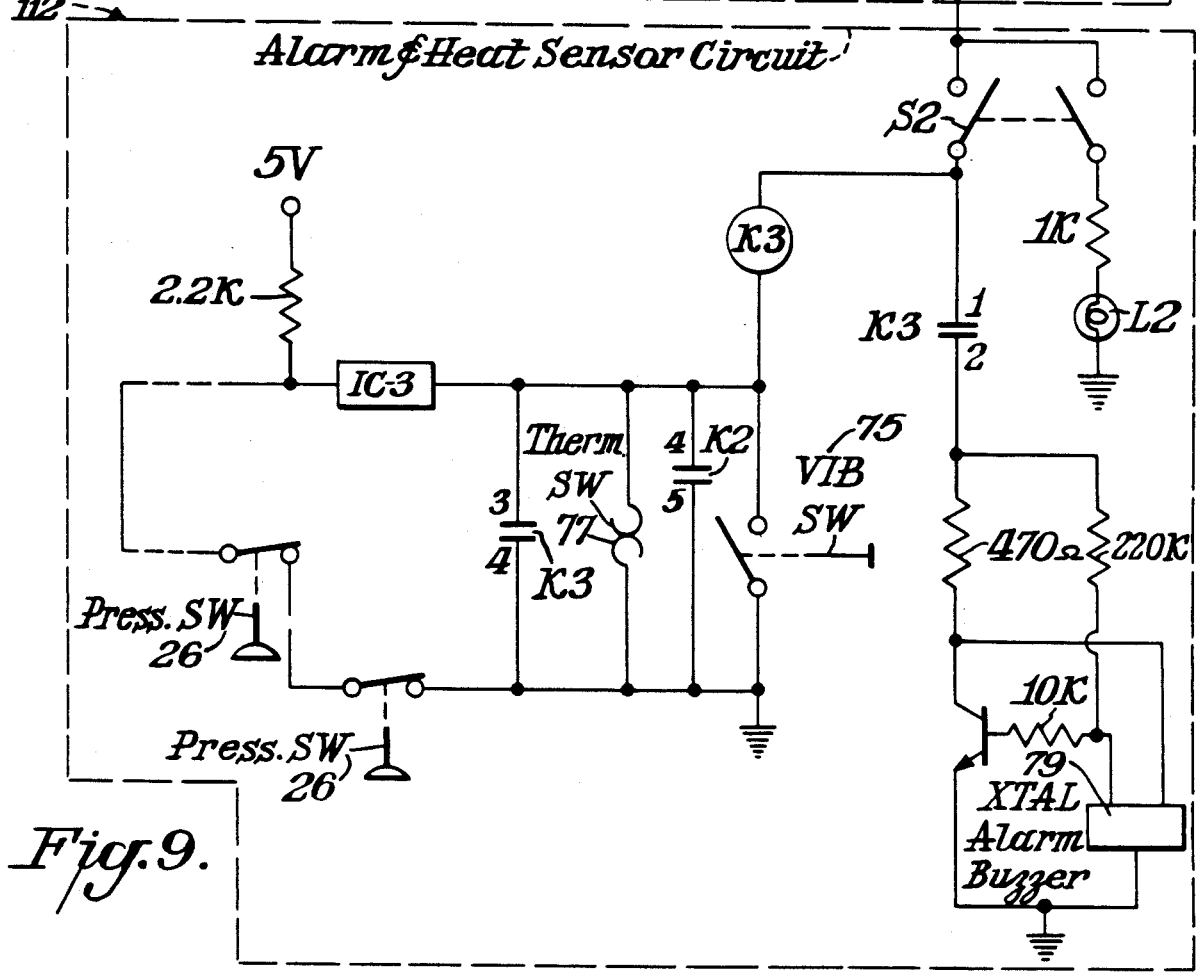
Fig. 9.

COMPUTER SECURITY DEVICE

BACKGROUND OF INVENTION

Today there is a proliferation of computers in society, and a great concern over data security. Ironically, the most valuable form of this data, the disk, is almost completely unprotected. Also, the computers, particularly the "PCs", have little security, from the standpoint of physical equipment protection, or from data protection. There is then a great need for better security for disks, both hard and floppy disks, and the computer system as a whole. Today only simple plastic boxes are available, which are seriously inadequate given the importance of the contents. Valuable hardware is becoming more compact and portable, making it increasingly vulnerable to physical theft.

Although the personal computer is so named, its use is not presently in any way restricted to the positive control of a given individual. Some personal computers are equipped with key lock turn-on devices, allowing only the key holding individual access but these provide no safety for disks and other valuable records. They also have the disadvantage of allowing only the key-holder access when access by other authorized personnel may be desired and being subject to loss of use through loss or theft of the key. In addition, failure to use the key to lock the system allows unauthorized individuals to access the system, allowing tampering with the data stored in the system.

SUMMARY OF THE INVENTION

An object of this invention is to provide a computer security system which effectively protects the various computer components.

A further object of this invention is to provide such a computer security system which will sound an alarm if there is unauthorized tampering or if abnormal environmental conditions such as a fire occur.

In accordance with this invention the computer security system utilizes a combination lock mechanism associated with a personal computer to assure individual control of machine operation and prevent unauthorized access to programs and/or data used on disks in conjunction with the given machine. In addition, an alarm device is included to issue a warning alarm in the event of excessive heat and/or unauthorized movement of or intrusions into the system. The device includes a housing which is compartmentalized to provide further protection for the magnetic data and/or programs contained on the disks by having the disk compartments sheathed by a thin metallic coating of low reluctance. The device essentially prevents unauthorized computer use by interrupting either power to the keyboard or main power to the central processor without combination lock access. Once the required cable is inserted into the housing it can be removed only by use of the combination lock access. Those units utilizing main power cable control also have surge protection installed.

THE DRAWINGS

FIG. 2 is a front elevation view of the compartmentalized housing used in the computer security system of FIG. 1;

FIG. 3 is a top plan view of the housing of FIG. 2;

FIGS. 4–5 are side and rear elevation views of the housing of FIGS. 2–3;

FIG. 7 is a cross-sectional view taken through FIG. 3 along the line 7—7;

FIG. 8 is a front elevation view a modified housing with its front door open; and FIG. 9 is an electrical diagram of the circuitry used for the computer security systems of FIGS. 1–8.

DETAILED DESCRIPTION

Figure 1:
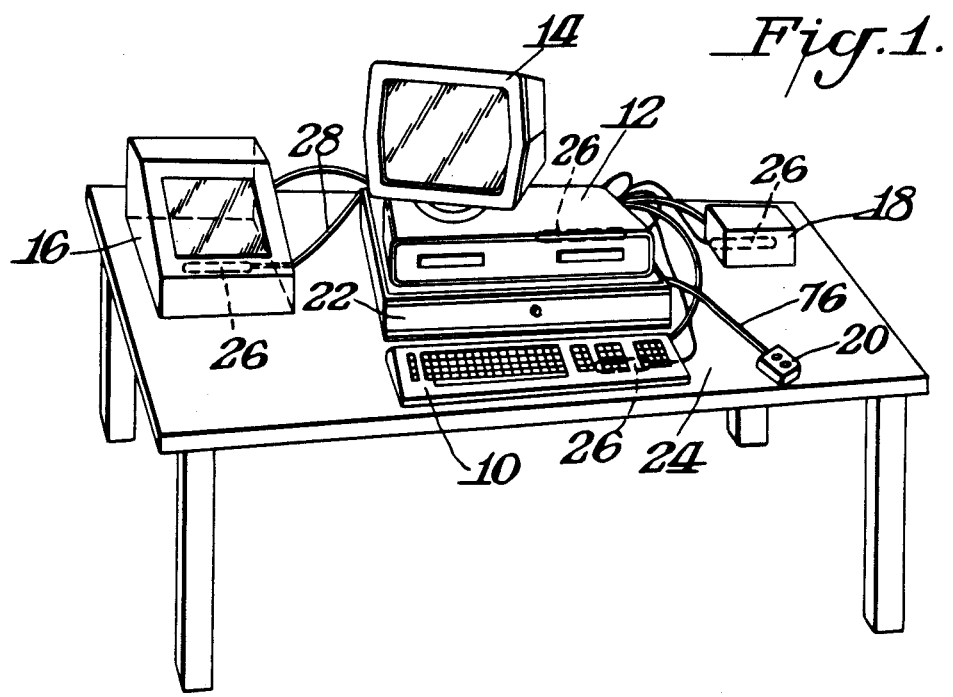
FIG. 1 is a perspective view of the computer security system of this invention.

FIG. 1 illustrates a computer security system in accordance with this invention. As shown therein a personal computer system includes conventional components such as a keyboard 10, control processing unit or disk drive 12, monitor 14, printer 16, modem 18 and mouse 20. FIG. 1 also illustrates compartmentalized security housing 22 positioned on table 24 or any other suitable support. FIG. 1 illustrates the components in their condition of use rather than their stored condition.

In accordance with this invention a pressure switch 26 would be located under each component which is intended to be stationary. Accordingly, as later described, if someone attempted to move any such component an alarm would be sounded. Each pressure switch 26 has its electrical power line 28 leading into housing 22.

Figure 6:
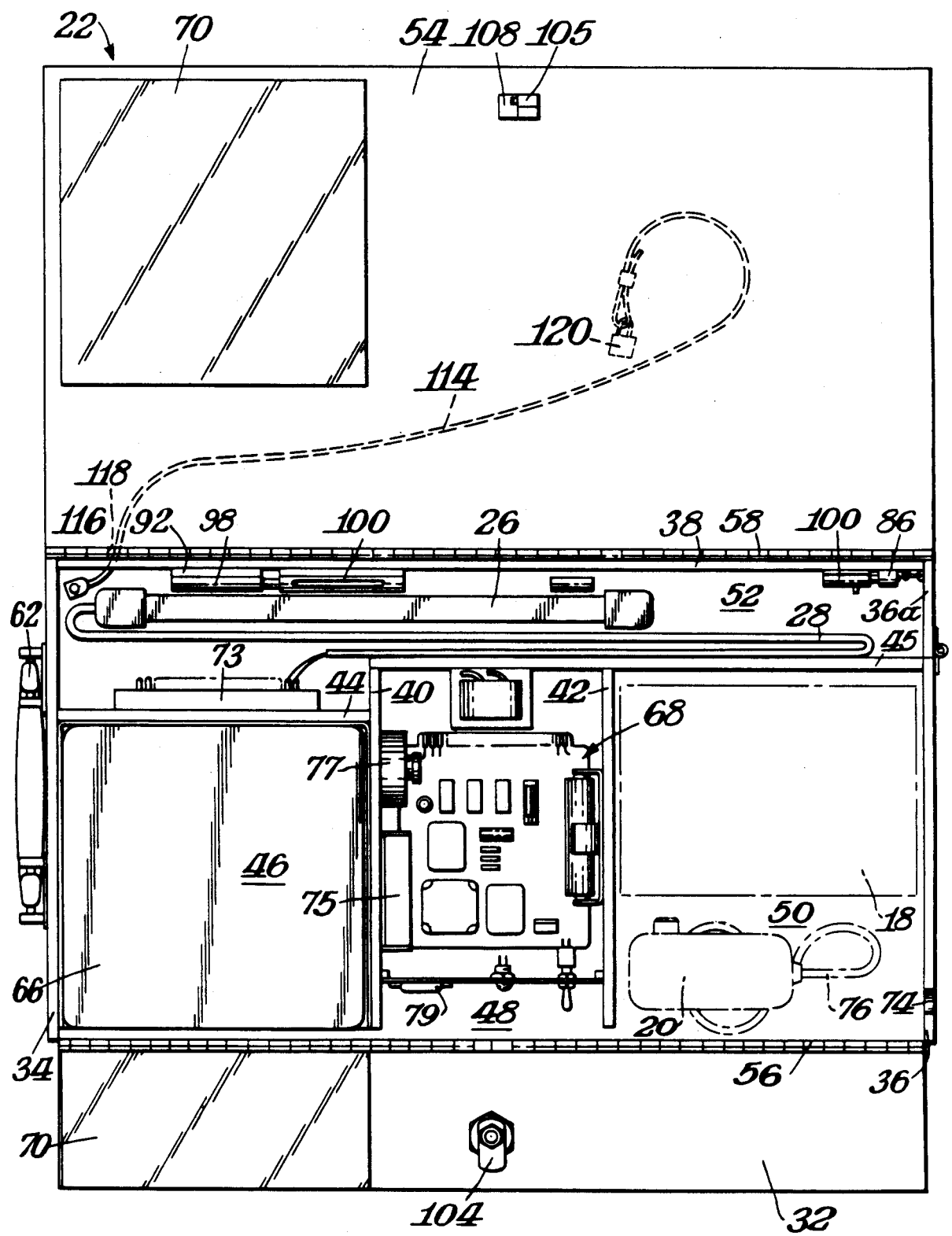
FIG. 6 is a top plan view of the housing of FIGS. 2–5 in the open condition.

As illustrated in FIGS. 2–7, housing 22 comprises a bottom wall 30 and four upstanding side walls 32, 34, 36, 38. As best shown in FIG. 6 a plurality of vertical partitions 40, 42, 44, 45 divide housing 22 into four compartments 46, 48, 50, 52. These compartments are covered by top wall 54. Front wall 32 is mounted at its lower end by hinge 56 to permit the front wall 32 to be opened and provide access to the interior of housing 22. Similarly a hinge 58 connects top wall 54 to rear wall 38. Advantageously since top wall 54 is flat and ordinarily would be securely mounted on the side walls, top wall 54 comprises a convenient support for such components as CPU 12 to minimize space. In this regard top wall 54 includes an upstanding 55 to prevent such component from sliding off top wall 54. Side wall 36 includes an end portion 36a which is connected by hinge 60 to the main portion of wall 36 whereby there may be access to the interior of compartment 32, as shown in FIG. 3, to permit the pressure switches 26 to be removed from housing 22. A handle 62 may be secured to side wall 34 to permit housing 22 to be easily transported. Alternatively the handle may be omitted (FIG. 5). A cage 64 is hingedly mounted to rear wall 38, as shown in FIG. 7 to keep the power cords from being unplugged and the various computer components moved. Alternatively, the power strip can be recessed so that a hinged panel is mounted to the rear wall instead of a protruding cage.

As shown in FIG. 6, compartment 46 is used for storing hard or floppy disks 66. Compartment 48 stores the electronics circuitry 68 for the system. Compartment 50 may store some of the smaller components such as mouse 20 and modem 18 or a built-in modem during periods of non-use. Elongated compartment 52 stores the various pressure switches 26 and their power cords 28 and security cables.

FIG. 8 shows a modified housing which includes a lower compartment 53 to provide added storage capability. As illustrated therein, door 32 is open and keyboard 10 is stored in compartment 53. A slide-out rack for the keyboard and a swivel base are optional features (not shown).

The ability to securely store hard or floppy disks 66 represents a significant feature of this invention. These so called "floppies" are used in conjunction with personal computers containing drive mechanisms capable of processing the disk in such a way that binary information in the form of magnetic tracks may be written thereon or read therefrom. The drives contained in the PC are also capable of erasing the information on the disk in whole or part under the direction of a computer operator or copying the information to a second disk. Proper handling of the disk is requisite to retaining the data magnetically recorded.

Since the disks are small (3¼" to 8" square, with the vast majority presently 5¼" square), thin (about twelve to 14" with cover), light (about five weighing 3 ounces), and can contain information of high value (e.g., Lotus 1-2-3 TM contained on one disk retails for approximately $450), they are susceptible to theft, to unauthorized copying, and to injury both of an electrical and physical nature. There is a need, therefore, for a device that will offer protection against these possibilities. Presently, no "personal use control" and diskette protective devices similar to that described herein have been known.

To protect disks 66 during storage a magnetic shield is provided for compartment 46. As shown in FIG. 6 the shield includes suitable thin metallic plates 70 of low reluctance on all six sides of compartment 46 to withstand the effects of stray magnetic fields.

Other features of housing 22 include anti-static feet 72. The main power cord 81 is secured to outlet housing 80 at the rear of housing 22. Wall 36 includes a slot 74 for accommodating the power cord 76 of mouse 20 during its use condition of FIG. 2.

The various power cords 78 for the computer components are secured externally to rear wall 38 on outlet housing 80 and are protected by cover or cage 64 to prevent tampering. (For the sake of clarity only one power cord 78 is shown.) As best shown in FIGS. 5 and 7 cage 64 is generally of U-shaped with its exposed side wall 82 having a plurality of slots 84 to permit each cord 78 to be plugged into an outlet of outlet strip 106 and then pass through a slot 84. Each cord 78 may also be mounted to rear wall 38 by hasp 86 (only one hasp being shown in FIG. 3). Upper wall 88 of cage 64 is mounted for rotation by hinge 90 to rear wall 38. An elongated slot 92 is provided in bottom wall 30 of housing 22 to permit extension 94 of cage bottom wall 96 to pass into compartment 52. Extension terminates in a loop 98 so that when cage back panel 64 is properly in place it may be locked in position by inserting slide bolts 100 into loop 98 when top wall 54 is open (FIG. 6).

In certain PC models, such as the Apple Mac TM the plug is not permanently attached to the CPU monitor. In such case where a detachable power cord is used, the invention would be practiced by using a suitable cable and locking/adhesive mechanism attached to the housing 22 to secure the computer and/or peripherals. A cable and locking/adhesive mechanism could be integrated into each pressure pad strip, or be separate. FIG. 6 illustrates such a mechanism which includes cable 114 anchored at 116 to housing 22. Cable 114 extends through hole 118 and terminates in a suitable lock 120, or adhesive or other device which is secured to the computer.

Housing 22 also includes an auxiliary battery 71 in the event of power failure or disconnection. As shown in FIG. 6 a terminal block 73 for switches 26 is mounted on partition 44. Reed switch 75 senses excess movement while heat sensor 77 senses excess temperature to actuate alarm 79, as later described.

FIG. 9 is a block diagram of the circuitry for the security system. Provisions for personal control of computer use are contained in the locking device which is an integral part of housing 22. The locking device consists of a miniature combination lock 102 (or digital, key, finger, eye or voice control) controlling a striker 104 which activates the power control relay. Activation of switch S-1 allows the power control relay contacts to furnish power to the outlet strip 106 mounted at the outlet housing 80 at the rear of housing 22 and subsequently to the peripheral equipment connected thereto by inserting the plugs for the various components into the outlets of strip 106. Each of the six outlets of outlet strip 106 is individually power controlled by on/off switches S-3 . . . S-8 (FIG. 8).

The input and output lines 78 cannot be removed from the housing 22 without combination access. In addition, the input power cord 78 to the computer, once installed, cannot be removed and reinstalled or removed and replaced by another cord without activating the alarm system. This last feature prevents system use by simple replacement of the power cord.

An alarm circuit is provided to give warning in the events of excessive heat an unauthorized movement. The circuit consists of three separate detector systems. The heat detector 77 will activate the alarm if the ambient temperature reaches for example 135° F. (55.3° C.). This would provide an alert if there is an overheating near the disks 66. The motion detector 75 will activate the alarm circuitry under an impulse developing for example 25 grams of pressure or less. This would warn if someone tried to move housing 22. The alarm circuit can be deactivated by switch S-2 when the computer system is in use.

The last detector system a series of pressure pads 26, is designed to be placed under the various peripherals, e.g., monitor, printer, modem, central processor, etc., to detect unwarranted movement or attempted theft. Cabling for the pressure pads 26 is attached to the various power cords connected to terminal strip 73 within housing 22 thus insuring the integrity of both the power cord and the pressure pad cabling.

Standard voltage surge protection and noise/spike/transient suppression circuitry are an integral part of the enclosed outlet strip 106. Provision is also made against brownout by the addition of an optional power failure back-up package 107 to boot the system into operation. The outlet strip enclosure or cage 64 prevents plug removal by virtue of its physical configuration and internal locking device. The alarm system is equipped with an on/off switch that activates a warning light in the off position and also allows deactivation of the alarm under proper security conditions. The alarm buzzer, when activated, will sound until reset.

FIG. 8 illustrates light L1 which would be on when the system is using main power, while light L2 would be on to indicate that auxiliary power from battery 71 is being used.

FIG. 3 illustrates striker 104 to be in contact with microswitch 105 to prevent housing 22 from being opened. By proper manipulation of lock 102, striker 104 would be moved out of contact with microswitch 105 to permit the housing to be opened. FIG. 6 illustrates striker 104 to be rotated to this position. When striker 104 contacts microswitch 105 the circuitry is energized. Additionally, when striker 104 is in the contacting position of FIGS. 2–3 striker 104 rests in U-shaped bracket 108 which is part of the microswitch bracket suspended from top 54. As a result both the top and front walls are prevented from being opened. In this respect upward movement of top wall 54 is prevented by the bight of bracket 108 contacting striker 104. Outward movement of front wall 32 is prevented by striker 104 contacting the outward arm of bracket 108. When striker is rotated 90° out of bracket 108, walls 32 and 54 can be opened.

The circuitry of FIG. 9 is divided into two parts: the power supply circuit 110 and the alarm and warning circuit 112.

In the power supply portion, 115 volts AC is fed from a standard outlet into the housing 22 by cord 81. There it supplies power to relay K-1 (SPST) (power control relay) which is grounded through the striker contacts controlled by combination lock switch LS-1 (102).

Combination lock LS-1 (102) allows access to the disk storage compartment 46 and simultaneously allows 115 v power to be supplied to the computer system through the normally open contacts 1-2 of K-1.

Secondly, 115 volts are continuously supplied to relay K-2 (DPST) (power interrupt signal relay) and to transformer T-1. T-1 (115 v-5 v) supplies power to a standard rectifier and regulator circuit.

Power to the computer system is controlled by switch S-1 mounted on the rear outlet panel 80 and accessible through the combination lock 102 and internal lock mechanism 98, 100 of the outlet strip cage 64. The system is further protected by circuit breaker CB-1 located in the outlet strip 106 and fuses F-1 and F-2 located on the control panel accessed through the disk compartment door 32 in the front of housing 22.

The normally open contacts of relay K-2 supply 5 v power to the alarm systems from the 115 v-5 power supply. In the event of power interruptions or failure, K-2 de-energizes and its normally closed contacts supply 5 v power to the alarm system from the back-up battery power supply 71. Other contacts on K-2 energize the alarm systems, giving warning that power has been interrupted.

In the alarm and warning circuit 112, when power is initially supplied, 115 v is applied to K-2 and 5 v to K-3 through S-2, the alarm reset switch A ground condition, activating the coils of K-3, occurs under the following conditions:

(a) Vibration switch 75 closes.
(b) Thermal switch 77 closes.
(c) Pressure switch 26 (PS-1, PS-2, etc.) opens, changing the input signal at 1C-3 Pin 1 to a high condition (+5 v) and the output (Pin 2) to ground. The pressure switches 26 are located under the system units to provide an alarm in the event of unauthorized movement.

Contacts 1-2 of Relay K-3 activate the alarm system while contacts 3 and 4 furnish a holding ground for the relay, keeping the alarm activated until S-1 is opened.

(d) Relay K-1 de-energizes, placing the system on backup power and closing contact 4 and 5, activating the alarm relay.

In use housing 22 would be opened by combination lock 102 which permits either front wall 38 or top wall 54 to be opened by rotating striker 104 out of bracket 108. Pressure switches 26 are removed through door 36a and placed under the components. Mouse 20 and modem 22 are removed from compartment 50 with their cords extending through notch 74 and the cords being connected to outlets in housing 22. (In the FIG. 8 modification, keyboard 10 would be removed from compartment 53.) Power for the system is derived from cord 81 plugged into a wall outlet. Disks 66 are removed from compartment 46. Cage 64 is opened. The cords 78 for the various components are plugged into outlet strip 106. These plugs are then rendered inaccessible by again locking cage 64 with the cords 78 extending through slots 84. If certain conditions, such as excessive movement, pressure or heat are reached an alarm is indicated.

GENERAL PURPOSES

The computer security system has two general purposes.

1. To make the PC truly "personal" by:
   a. providing total PC/computer workstation security (i.e. for all hardware and software components)
   b. providing comprehensive security (i.e. covering the complete spectrum of security problems/needs).
      1. heat/fire
      2. data theft/copying
      3. time theft/unauthorized use
      4. tampering, alteration, damage, erasure
      5. physical theft/damage
      6. power surges/spikes/noise/transients
      7. static electricity
      8. power failure/brownout
      9. Disconnect/deactivation — independent backup power supply
      10. magnetic erasure
      11. water/dust/light
2. To provide a PC security system that is convenient, especially by consolidating several devices/functions into one unit that is:
   a. inexpensive — very affordable
   b. universally compatible — fits or interfaces all makes and models
   c. simple and reliable — uncomplicated design
   d. flexible to use — central power on/off control and individual feature selection
   e. space saving — compact, efficient storage/file for software/peripheral hardware, plus built-in modem and by keyboard drawer options. These consolidate components thus eliminating clutter.
   f. ergonometric design — fits under monitor or keyboard making efficient use of workspace and base swivels for ease of use.
   g. portable — light weight with carry handle The invention offers a total spectrum of protection, from which the user can select his "menu" or desired combination of security features. The invention offers a range of choice of protection/security against (but not limited to):

The housing 22 can be placed either:
(a) Free-standing (by itself).
(b) Under the keyboard, printer, monitor, disk drive, or on top of the CPU.

The connection/activation options include the following:
(a) Free-standing — remote signal; no plugging in.

(b) Interfacing — plugging into the computer and/or a peripheral. (i.e. printer, keyboard, disk drive, modem, etc.)

(c) Integral — built in, as a permanently joined part of the computer system.

(d) Plugging into a wall socket.

Selection of Features (a) Features can be selected by on/off switches located inside the housing 22.

The mechanisms that provide the above security options are:

(a) Alarm.
(b) Motion sensor.
(c) Heat sensor.
(d) Key/combination/fingerprint/voice/etc. — Lock.
(e) Surge shunt.

The housing 22 may contain collapsible racks/files (preferably 2 plastic, 25 disk capacity each) and a carry handle recessed in the back center panel or handle 62 at one side thereof.

The housing 22 can be used to simply peripheral space by models that incorporate a modem, extra memory, etc.

What is claimed is:

1. A computer security device for protecting the components of a personal computer system or the like comprising a housing having top, bottom, front, rear and side walls, a door for providing access to the interior of said housing, said housing including at least three compartments wherein there is simultaneous access to the interior of said compartments when said door is opened, one of said compartments being a disk storage compartment which is lined with low reluctance shielding material, lock means for preventing access to said interior, electrical control means including internal power surface means in another one of said compartments in said housing, a main power source in said housing for supplying power to said internal power source means, said power source means including outlet means whereby the electrical power cords of the system components may be plugged into said outlet means, and means for locking the component power cords to said housing.

2. The device of claim 1 wherein one of said compartments is a pressure switch storage compartment, a plurality of pressure switches selectively stored in a said pressure switch storage compartment and selectively placeable under selected components of the system, and said pressure switches being powered by said internal power source means.

3. The device of claim 2 wherein said top wall is hinged to comprise said door for selectively providing access to all of said compartments.

4. The device of claim 3 wherein said front wall is hinged to comprise a further door for providing access to selected compartments.

5. The device of claim 4 wherein at least a portion of one of said side walls is hinged to provide access to said pressure switch storage compartment.

6. The device of claim 5 wherein said electrical control means includes condition sensing means for sensing a change in pressure and for sensing the condition of a predetermined motion being exceeded and for sensing the condition of a predetermined temperature being exceded, and alarm means for indicating the sensing of any of said conditions.

7. The device of claim 6 wherein said plug locking means includes a cage hinged to said rear wall for limiting access to said outlet means and the component plugs, said cage having to slotted front wall, and locking means on said cage and said bottom wall.

8. The device of claim 7 wherein said lock means is a combination lock mounted on said front wall, a striker controlled by said lock, and said striker being in selective contact with a microswitch in said electrical control means.

9. The device of claim 8 wherein one of said compartments is a components storage compartment.

10. The device of claim 9 wherein said top wall is flat to provide a support surface for a component of the system, an upstanding rim being on said top wall, and a carrying handle secured to one of said walls.

11. The device of claim 10, in combination with a personal computer system, and said system includes a keyboard and a monitor and a printer and a disk drive and a modem and a mouse.

12. The device of claim 11, wherein said system includes a keyboard and a monitor and a printer and a disk drive and a modem and a mouse.

13. The device of claim 12, including floppy disks in said disk storage compartment.

14. The device of claim 1, in combination with a personal computer system, and said system includes a keyboard and a monitor and a printer and a disk drive and a modem and a mouse.

15. The device of claim 14, including floppy disks in said disk storage compartment.

* * * * *